(12) United States Patent
Gehring et al.

(10) Patent No.: US 6,536,667 B2
(45) Date of Patent: Mar. 25, 2003

(54) APPARATUS AND A METHOD FOR THE IDENTIFICATION OF CODES

(75) Inventors: Roland Gehring, Elzach-Prechtal (DE); Jürgen Reichenbach, Emmendingen (DE); Reinhold Kilian, Waldkirch (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 09/975,328

(22) Filed: Oct. 10, 2001

(65) Prior Publication Data

US 2002/0040933 A1 Apr. 11, 2002

(30) Foreign Application Priority Data

Oct. 11, 2000 (DE) .......................................... 100 50 368

(51) Int. Cl.$^7$ ................................................. G06K 7/10
(52) U.S. Cl. ............................ 235/462.31; 235/462.01; 235/462.08; 235/462.09; 235/462.1; 235/462.25
(58) Field of Search .................. 235/462.31, 462.01, 235/462.14, 462.08, 462.09, 462.1, 462.25

(56) References Cited

U.S. PATENT DOCUMENTS

| | | | | |
|---|---|---|---|---|
| 4,920,255 A | * | 4/1990 | Gabeler ....................... 235/454 |
| 5,019,714 A | * | 5/1991 | Knowles ................. 235/462.14 |
| 5,426,288 A | * | 6/1995 | Obata et al. ................. 235/454 |
| 5,481,096 A | * | 1/1996 | Hippenmeyer et al. ..... 235/454 |
| 5,902,986 A | * | 5/1999 | Barkan et al. ............... 235/454 |
| 6,049,406 A | * | 4/2000 | Zocca .................... 235/462.16 |
| 6,325,289 B1 | * | 12/2001 | Mazzone ................ 235/462.14 |
| 6,347,740 B1 | * | 2/2002 | Bengala ....................... 235/454 |
| 6,357,659 B1 | * | 3/2002 | Kelly et al. ............. 235/462.01 |

FOREIGN PATENT DOCUMENTS

| | | |
|---|---|---|
| DE | 2951780 C3 | 7/1980 |
| DE | 19508024 A1 | 9/1996 |
| DE | 19940403 A1 | 3/2001 |
| EP | 0704821 A2 | 4/1996 |

OTHER PUBLICATIONS

Alles in einer Kamera. In: Technische Rundschau, No. 7, 1999, p. 19.
Fischer, St.: Komplett verpackt. In: Elektronik Praxis, No. 18, 1998, pp. 97.

* cited by examiner

*Primary Examiner*—Thien M. Le
*Assistant Examiner*—April Nowlin
(74) *Attorney, Agent, or Firm*—Townsend and Townsend and Crew LLP

(57) ABSTRACT

An apparatus and method for the recognition of codes has a light transmitter for the transmission of light signals in the direction of a scanning region, a light receiver for the reception of a light signal remitted from the scanning region, and a control and evaluation unit for the control of the light transmitter and the light receiver and for the determination of a code from the light signal received. The control and evaluation unit includes a trigger circuit triggering the determination of a code and a distance determination unit or image detection unit (which acts on the trigger circuit) for the detection of an object present in the scanning region which is integrated into the apparatus.

18 Claims, 3 Drawing Sheets a)

b)

c)

APPARATUS AND A METHOD FOR THE IDENTIFICATION OF CODES

BACKGROUND OF THE INVENTION

The invention relates to an apparatus for the recognition of codes comprising a light transmitter for the transmission of light signals in the direction of a scanning region, a light receiver for the reception of a light signal remitted from the scanning region, and a control and evaluation unit for the control of the light transmitter and the light receiver and for the determination of a code from the light signal received, with the control and evaluation unit including a trigger circuit which triggers the determination of a code. The invention further relates to a method for the recognition of codes by means of a code reader, in which light signals are transmitted by a light transmitter in the direction of a scanning region, the light signals are remitted from the scanning region to a light receiver, and the output signal of the light receiver is supplied to a control and evaluation unit for the control of the light transmitter and of the light receiver and for the determination of a code from the light signal received, with the determination of a code being triggered by a trigger circuit associated with the control and evaluation unit.

It is known in accordance with the prior art to use an external light barrier as the trigger circuit which is in a position to detect articles transported on a conveyor belt, for example, and to trigger the start of a read gate in dependence on the detection of an object, with a code determination by the code reading taking place within said read gate. It is achieved in this manner that an attempt is only made to determine a code when there is also actually an object possibly bearing a code within the scanning region.

The fact is disadvantageous in the prior art that the code reader and the light barrier represent two separate units which have to be installed in a mutually spaced manner so that a comparatively large amount of room is taken up for the total arrangement and, furthermore, an installation of the two units exactly adjusted to one another is also required.

SUMMARY OF THE INVENTION

An object of the invention consists of further developing an apparatus or a method of the kind initially mentioned such that both the adjustment effort and the installation room taken up are reduced.

This object is satisfied with an apparatus of the invention in that a distance determination unit or image detection unit for the detection of an object present in the scanning region and acting on the trigger circuit is integrated into the apparatus. The object is satisfied by a method of the invention in that the trigger circuit is acted on by a distance determination unit or image detection unit integrated in the code reader for the detection of an object present in the scanning region.

In accordance with the invention, the external light barrier known from the prior art is therefore replaced by a distance determination unit or image detection unit which is integrated into the apparatus or into the code reader. As the code reader and the distance determination unit or image detection unit are thus formed as a single assembly, the room requirements taken up can be reduced. Moreover, all required adjustment procedures between the code reader and the distance determination unit or image detection unit can be made during the mounting of the total assembly so that respective adjustment work in the installation of the assembly on site is omitted.

Furthermore, the distance determination unit or image detection unit provided in accordance with the invention is able to provide more detailed information on a detected object than was possible with a light barrier of the prior art which was only able to report whether the object is present or not. In accordance with the invention, namely, information can additionally be determined and evaluated on the size, shape, direction of movement, speed, color, etc. of the object.

Moreover, maintenance and service as well as a replacement of the total arrangement is simplified by the design in accordance with the invention of the total arrangement as only one single assembly.

It is advantageous for the light transmitter, the light receiver, the control and evaluation unit of the code reader and the distance determination unit or the image detection unit to be arranged in a common housing. The arrangement in a common housing can make it possible, for example, that only one light transmitter and/or only one light receiver are provided which are both used by the distance determination unit or image detection unit and controlled by the control and evaluation unit for the code determination. In this manner, the realization of the total arrangement with a single light transmitter and a single light receiver is sufficient, which reduces the manufacturing costs, on the one hand, and makes adjustment work between the code determination unit and the distance determination unit or image detection unit absolutely superfluous since the use of a common light transmitter and of a common light receiver ensures that both units cover the same field of view or the same scanning region.

Alternatively, however, it is also possible to use more than one light transmitter and only one light receiver, more than one light transmitter and more than one light receiver, or only one light transmitter and more than one light receiver. If a plurality of light transmitters or light receivers are provided, one light transmitter or light receiver can be associated with the distance determination unit or image detection unit and a further light transmitter or light receiver be used by the code reader.

Likewise, a plurality of light transmitters, which work, for example, with different wavelengths, can be used both by the distance determination unit or image detection unit and by the code reader, and/or a plurality of light receivers, which have, for example, different focus settings, can be used both by the distance determination unit or image detection unit and by the code reader.

The ending of the code determination preferably takes place in dependence on the distance values or image values supplied by the distance determination unit or image detection unit so that, ultimately, a time-wise restricted read gate is generated in dependence on these supplied values. This read gate can consequently be set such that it is always open when an object is in the scanning region.

It is alternatively also possible to end the read gate for the code determination after a predetermined time interval subsequent to the triggering of the code determination. This time interval can be set in this respect such that the read gate extends with high probability over that time period in which an object is located in the scanning region.

It is of advantage if a signal output is provided for the making available of information with respect to an object present in the scanning region determined from the supplied distance value or image values. Information on a recognized object can be transmitted to further apparatuses of the same kind or of a different kind via this signal output. A specific application will still be explained as part of the figure description.

It is furthermore preferred for a unit to be provided for the determination of the speed of an object moving in the scanning region from the distance values or image values supplied in a time sequence by the distance determination unit or image detection unit. It can, for example, be determined from speeds determined with such a unit when a read gate begins and ends in a meaningful manner, provided that the object recognized moves at least at largely constant speed.

The distance determination circuit integrated into the code reader in accordance with the invention can preferably act on a focusing unit for focusing an optical transmission and/or reception system associated with the light transmitter and/or with the light receiver on an object present in the scanning region. It can thus be ensured that the focus is always ideally matched to the momentarily present distance between the object and the code reader.

In this respect, the focusing can be initiated before or simultaneously with the triggering of the code determination. If the focusing is initiated before the triggering of the code determination, it is of advantage for the distance between the object and the code reader present at the code determination to be calculated in advance and for the focus to be able to be already correctly adjusted in advance so that the correct focus is already set directly at the start of the code determination.

It is furthermore possible to automatically adjust the focusing unit to different, successive distance values covering all possible read distances during a code determination. This embodiment of the invention is explained in more detail as part of the figure description.

It is of advantage for the distance determination to take place in a part of the scanning region or in the total scanning region such that not only one single distance value, but a two- or three-dimensional distance profile can be determined. The spatial and/or time-wise patterns in which the single distance values of a distance profile are determined can be individually fixed. A rough pattern results in this respect in an increased evaluation speed which, however, is obtained at the cost of accuracy. A finer pattern slows the evaluation speed, but provides higher accuracy.

It is particularly preferred for a two-or three-dimensional background profile to be taught/learned before the code determination and for the difference profile between the momentarily determined two- or three-dimensional distance profile and the taught/learned background profile to be evaluated as part of the code determination. It becomes possible in this way to reliably recognize objects in containers without the container supplying interfering distance values, since the container shape can be taught/learned in advance as a background profile. It is furthermore advantageous that it can also be recognized in the manner described whether an object is located in a container or not, and indeed independent of whether a code can subsequently be read or not.

In the latter case, the difference profile, in particular the minimum value of the difference profile, can be used for the focusing. Trials have shown that the use of the minimum value here, which usually corresponds to the upper side of the object, leads to a good result since the focus is then adjusted as a rule such that a code located on the upper side of an object can be read.

The distance determination unit or image detection unit of the invention is preferably not activated constantly, but only cyclically, so that the individual components of the apparatus, in particular the focusing unit or the light transmitter, which is preferably formed as a laser diode, do not age too quickly due to the interposed pauses.

The invention is explained in the following by means of embodiments with reference to the drawings.

DESCRIPTION OF THE PREFERRED EMBODIMENTS

Figure 1:
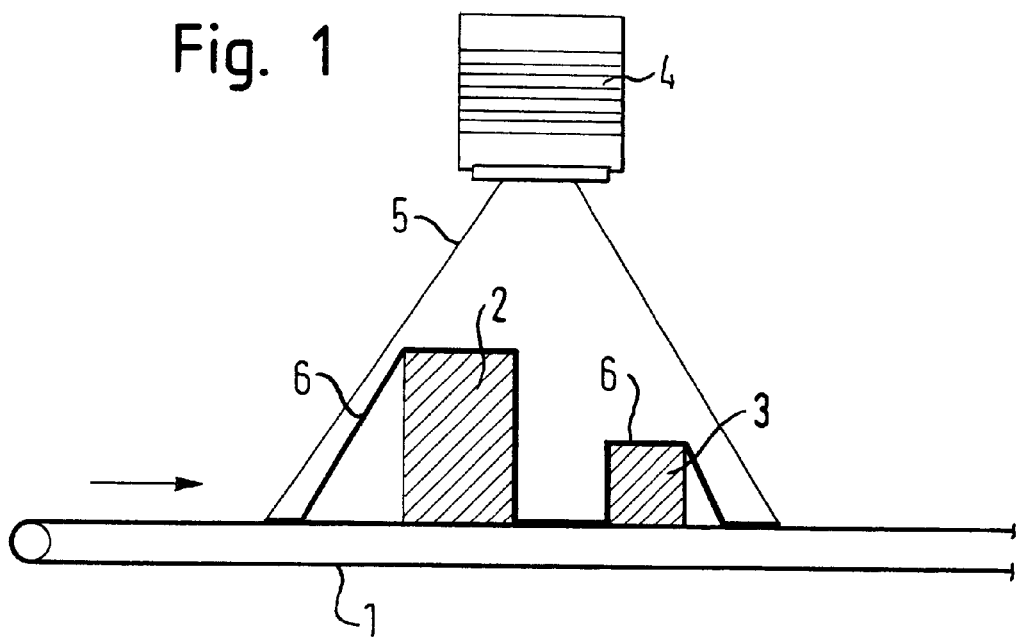
FIG. 1 is a schematic side view of an apparatus of the invention with two objects located in the scanning region.

FIG. 1 shows two objects 2, 3 transported in the direction of the arrow on a conveyor belt 1. An apparatus 4 of the invention, which includes both a code determination unit and a distance determination unit, is arranged above the conveyor belt 1.

Both units have the same field of view and thus detect the same scanning region 5 illustrated as a cone of rays in FIG. 1.

The distance determination unit is able to recognize a distance profile 6 for this purpose. This distance profile 6 is examined in an evaluation unit included in the apparatus 4 as to whether objects 2, 3 are located in the scanning region 5 or not. In the present case, it can be recognized by the course of the distance profile 6 that a larger object 2 and a smaller object 3 are located in the scanning region 5. The distance at which the two objects 2, 3 are located with respect to the apparatus 4 can moreover be calculated from the distance profile so that a corresponding focusing on the objects 2, 3 can be effected within the apparatus 4. If codes are located at the upper side of the objects 2, 3, these can then be recognized without problem by the apparatus 4 with a correctly adjusted focus.

If the distance profile 6 determined shows a curve which allows the conclusion that there are no objects 2, 3 in the scanning region 5, no code reading is triggered in accordance with the invention so that ultimately an attempt is always only made to recognize a code when there is also actually an object 2, 3 in the scan area 5.

Since the distance determination unit, which can also optionally be formed as an image detection unit, is located inside the housing of the apparatus 4, it is not necessary to mutually adjust the code reading unit and the distance determination unit. Moreover, only low space requirements are needed for the apparatus 4.

Figure 2:
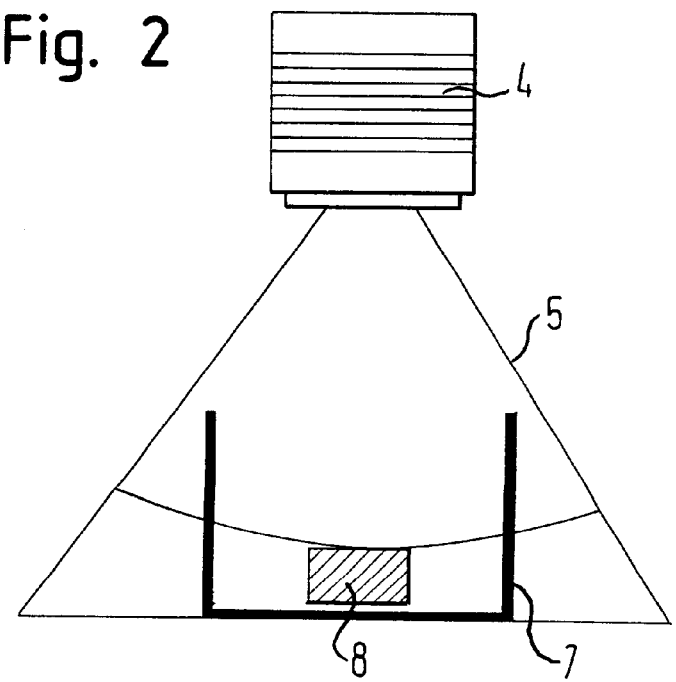
FIG. 2 is a schematic side view of an apparatus of the invention for the recognition of objects inside a container.

FIG. 2 shows an apparatus 4 in accordance with FIG. 1 with a scanning region 5, wherein in accordance with FIG. 2 a container 7, in which an object 8 is placed, is located in the scanning region 5. It was difficult with such arrangements in accordance with the prior art to distinguish the object 8 from the container 7, which could result in attempts to read codes when no object was present in the container 7. It is, however, now possible in accordance with the invention to teach/learn a background profile before the code determination which represents the shape of the container 7. This background profile can then be subtracted from the momentarily determined distance profile so that the difference profile determined in this way does not include any background information, but only object information. Corresponding profile curves are represented in FIGS. 3a to 3c.

Figure 3:
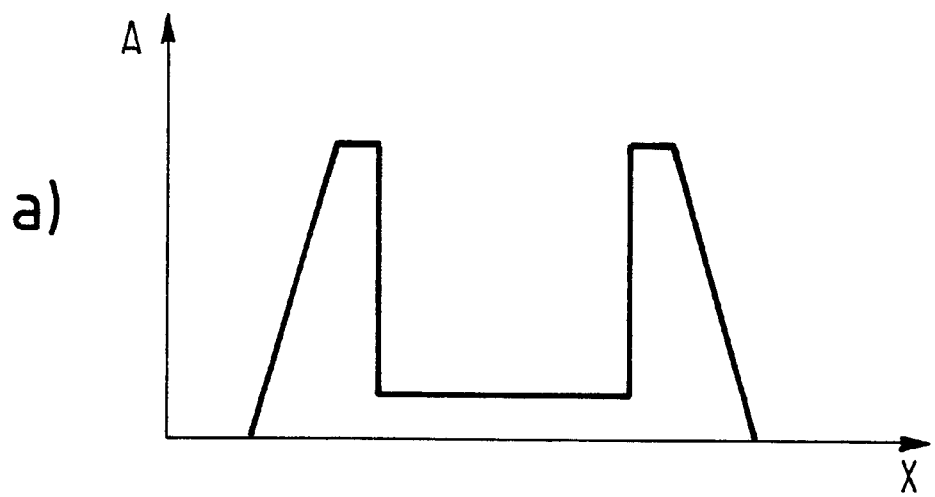
FIG. 3 shows distance profiles determined in accordance with a method of the invention.
Figure 3:
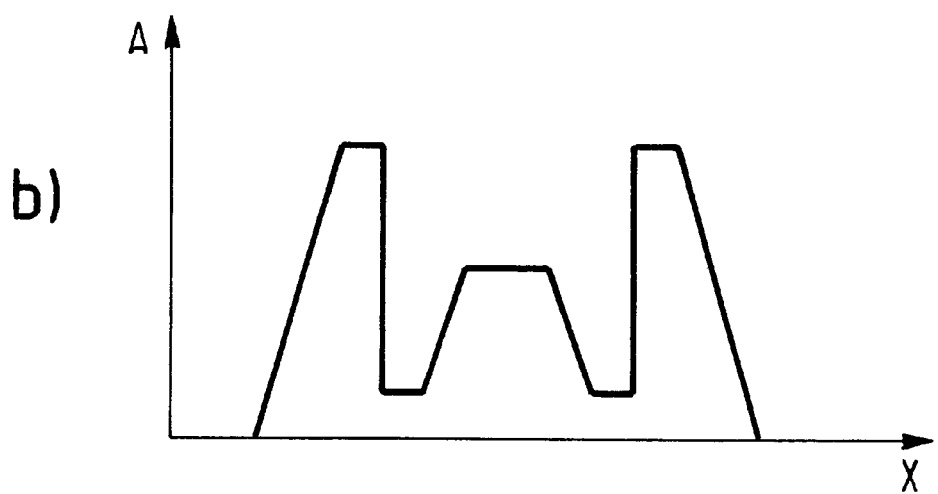
Figure 3:
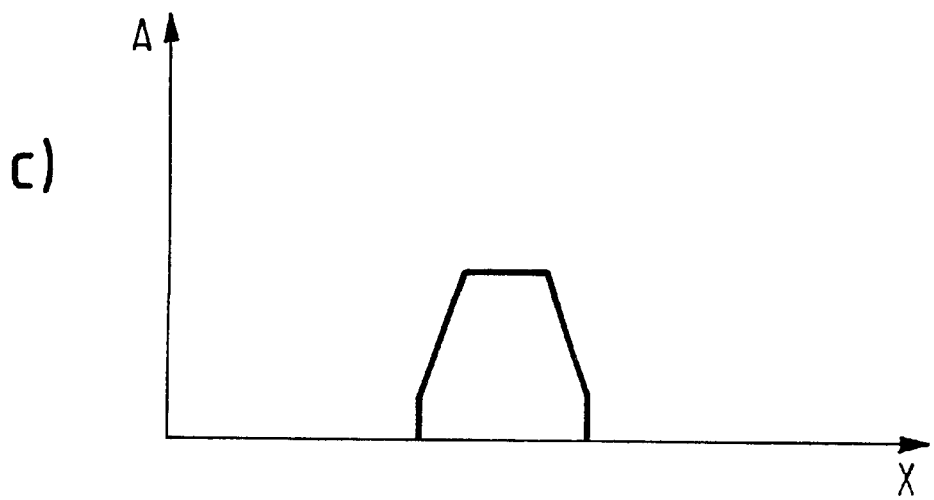

FIG. 3a shows the curve of the background profile which characterizes an empty container 7. FIG. 3b shows the curve of a momentary distance profile of a container 7 filled with an object 8, and FIG. 3c shows the difference between the profile of FIG. 3b and the profile of FIG. 3a. The curve of this difference profile of FIG. 3c allows it to clearly be seen that the difference profile now only includes information on the object 8, but not information on the container 7. To this extent, it can, on the one hand, be recognized without problem on the basis of the difference profile whether a filled or an empty container 7 is present. On the other hand, the distance of the object 8 to the apparatus 4 (FIG. 2) can be determined from the difference profile so that the focus can be correctly adjusted with respect to the object 8.

Figure 4:
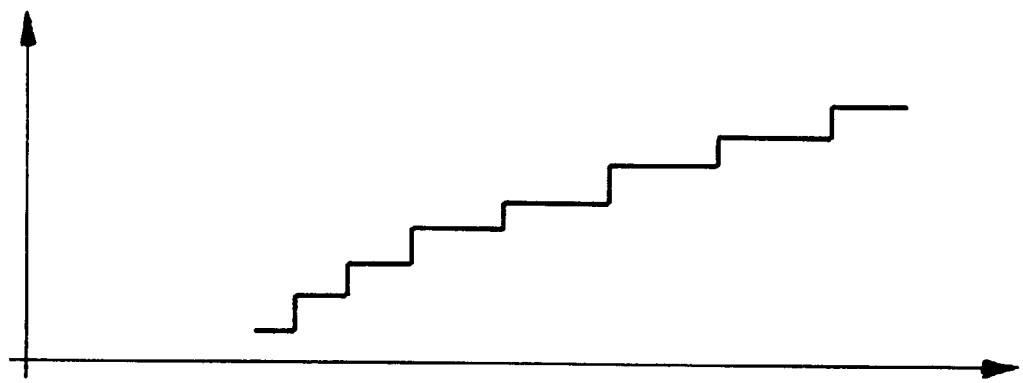
FIG. 4 shows a characteristic line for the focusing unit in which the focus position is entered over the read distance.

The characteristic line for the focusing unit of FIG. 4 shows a step-like curve, which means that a constant focus position can be set in each case for a determined read distance region. It is naturally also alternatively possible to continuously change the focus position with the read distance. The characteristic line of FIG. 4 is used in particular when the focusing unit is automatically adjusted to different values during a single code determination. For example, the eight values illustrated in FIG. 4 can be successively set during the determination of a code so that all possible read distances are covered and the correct focus is present and a code can be determined in one of the eight settings, with the different focus positions of FIG. 4 being able to be moved to in any desired time-wise sequence.

Figure 5:
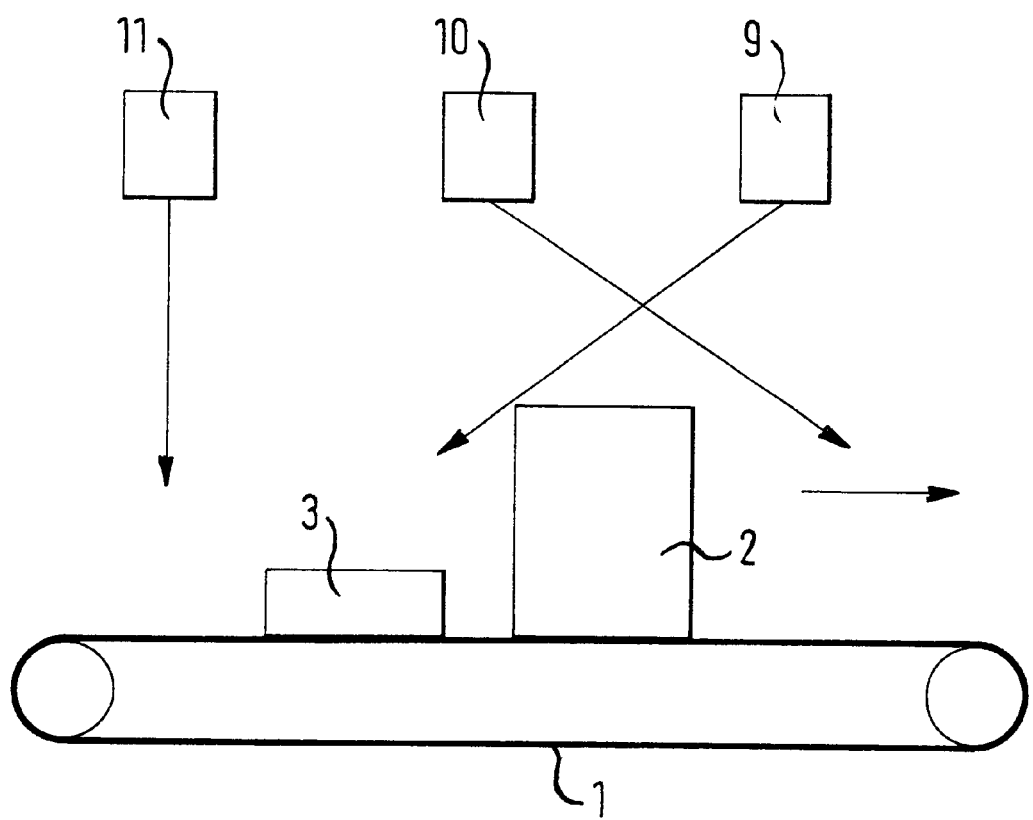
FIG. 5 is a schematic side view of two articles which are transported on a conveyor belt and which can be detected by three apparatuses of the invention arranged in a mutually spaced manner.

FIG. 5 shows two objects 2, 3 which are transported in the direction of the arrow on a conveyor belt 1. A total of three apparatuses 9, 10, 11 of the invention are located above the conveyor belt and each of these is able to determine a code and also to determine a distance profile. The directions of view of the two apparatuses 9, 10 cross and thus extend obliquely to the conveying plane, whereas the direction of view of the apparatus 11 is downwardly directed perpendicular to the conveying plane.

The apparatuses 10 and 11 each have a signal output for the making available of information determined from the distance values supplied with respect to an object present in the respective scanning region via which the said information can be transmitted to the respective other apparatuses 9, 10, 11.

It is specifically the case in the arrangement of FIG. 5 that the apparatus 9 "sees" the objects 2, 3 transported in the conveying direction or determines their distance profiles before the apparatus 10 so that the respective information can be transmitted to the apparatus 10 before the objects 2, 3 enter into the scanning region of the apparatus 10. This has the advantageous effect that the read gate of the apparatus 10 can be correctly calculated from the known speed of the conveyor belt 1 and from the distance profile determined by the apparatus 9. Moreover the focus of the apparatus 10 can also already be adjusted on site on the basis of the distance values supplied by the apparatus 9.

If the speed of the conveyor belt 1 is not known, this speed can alternatively also be calculated using the time-wise change in the distance profiles determined.

An additional improvement is obtained if the apparatus 11 already recognizes the objects 2, 3 or determines their distance profiles in advance. The apparatus 11 can then pass this information on to the apparatuses 9 and 10 so that the read gates of the apparatuses 9 and 10 and the focus positions of these apparatuses can already be correctly calculated before the objects 2, 3 enter into the scanning region of these apparatuses 9, 10. The apparatuses 9, 10 can then both be used for the code recognition, with the double code recognition effected by the two apparatuses offering additional reliability for the correctness of the code recognition.

It is moreover possible that the apparatus 11 also already attempts to recognize the code respectively located on the objects 2, 3. If a code was recognized by the apparatus 11 and if then the increasing of the reliability of the code recognition by a repeated reading by the apparatuses 9 and/or 10 is waived, the apparatuses 9, 10 no longer have to be subsequently activated; that is, the apparatus 11 can supply information via its signal output in accordance with which the apparatuses 9, 10 do not have to open any more read gates.

What is claimed is:

1. An apparatus for the recognition of codes comprising a light transmitter for the transmission of light signals in the direction of a scanning region, a light receiver for the reception of a light signal remitted from the scanning region, a control and evaluation unit for the control of the light transmitter and the light receiver and for the determination of a code from the light signal received, the control and evaluation unit including a trigger circuit triggering the determination of a code, and a distance determination unit or image detection unit integrated into the apparatus for the detection of an object present in the scanning region, acting on the trigger circuit, and determining the distance in a part of the scanning region so that a two- or three-dimensional distance profile can be determined.

2. An apparatus in accordance with claim 1, wherein the light transmitter, the light receiver, the control and evaluation unit and the distance determination unit or image detection unit are arranged in a common housing.

3. An apparatus in accordance with claim 1, wherein only one light transmitter and/or only one light receiver are provided which are both used by the distance determination unit or image detection unit and controlled by the control and evaluation unit for the code determination.

4. An apparatus in accordance with claim 1, wherein the trigger circuit is also for ending the code determination taking place in dependence on the distance values or image values supplied by the distance determination unit or image detection unit so that the trigger circuit ultimately generates a time-limited read gate dependent on supplied distance values or image values.

5. An apparatus in accordance with claim 1, including a focusing unit for focusing an optical transmission system and/or an optical reception system associated with the light transmitter and/or the light receiver onto an object present in the scanning region which is acted on by the distance determination unit or image detection unit.

6. An apparatus in accordance with claim 1, wherein a signal output is provided for making available information determined from the supplied distance values or image values with respect to an object present in the scanning region.

7. An apparatus in accordance with claim 1, including a unit for the determination of the speed of an object moving in the scanning region from the distance values or image values supplied in time sequence from the distance determination unit or image detection unit.

8. A method for the recognition of codes by means of a code reader, in which light signals are transmitted by a light transmitter in the direction of a scanning region, the light signals are remitted from the scanning region to a light receiver, and the output signal of the light receiver is supplied to a control and evaluation unit for the control of the light transmitter and the light receiver and for the determination of a code from the received light signal, the determination of a code being triggered by a trigger circuit associated with the control and evaluation unit, the trigger circuit being acted on by a distance determination unit or image detection unit integrated into the code reader for the detection of an object present in the scanning region, distance determination taking place in at least a part of the scanning region so that a two- or three-dimensional distance profile can be determined.

9. A method in accordance with claim 8, wherein the same light transmitter and/or light receiver is respectively used for both the distance or image determination and for the code determination.

10. A method in accordance with claim 8, wherein the ending of the code determination takes place in dependence on the distance values or image values supplied from the distance determination unit or image detection unit, so that ultimately a time-limited read gate is generated which is dependent on the distance values or image values supplied.

11. A method in accordance with claim 8, wherein the ending of the code determination takes place after a predetermined time interval which is subsequent to the triggering of the code determination.

12. A method in accordance with claim 8, wherein the distance determination unit acts on a focusing unit for the focusing of an optical transmission system and/or an optical reception system associated with the light transmitter and/or the light receiver onto an object present in the scanning region.

13. A method in accordance with claim 12, wherein the focusing is initiated before or simultaneously with the triggering of the code determination.

14. A method in accordance with claim 12, wherein the focusing unit is automatically set to different, successive distance values covering all possible read distances during a code determination.

15. A method in accordance with claim 8, wherein information with respect to an object present in the scanning region determined via a signal output from the supplied distance values or image values is supplied to further apparatuses for the recognition of a code.

16. A method in accordance with claim 15, wherein a two- or three-dimensional background profile is taught/learned prior to the code determination and a difference profile between the momentarily determined two- or three-dimensional distance profile and the taught/learned background profile is evaluated as part of the code determination.

17. A method in accordance with claim 16, wherein the minimum value of the difference profile is used for focusing.

18. A method in accordance with claim 8, wherein the distance determination unit is activated cyclically.

* * * * *